United States Patent
Pak et al.

(10) Patent No.: US 8,965,980 B2
(45) Date of Patent: Feb. 24, 2015

(54) UNIVERSAL SUPPORT FOR MULTIPLE EXTERNAL MESSAGING SYSTEMS

(75) Inventors: Wai H. Pak, Hercules, CA (US); Sanjeev Kumar, San Mateo, CA (US); Zhanye Tong, Foster City, CA (US); Yu Jen Wu, San Mateo, CA (US)

(73) Assignee: Siebel Systems, Inc., San Mateo, CA (US)

( * ) Notice: Subject to any disclaimer, the term of this patent is extended or adjusted under 35 U.S.C. 154(b) by 2514 days.

(21) Appl. No.: 10/400,833

(22) Filed: Mar. 27, 2003

(65) Prior Publication Data

US 2007/0198672 A1 Aug. 23, 2007

(51) Int. Cl.
*G06F 15/16* (2006.01)
*H04L 12/58* (2006.01)
*H04L 29/08* (2006.01)

(52) U.S. Cl.
CPC .............. *H04L 12/58* (2013.01); *H04L 12/589* (2013.01); *H04L 51/36* (2013.01); *H04L 67/22* (2013.01)
USPC ............ 709/206; 709/207; 709/203; 709/204

(58) Field of Classification Search
USPC ................. 709/203, 201, 202, 204, 205, 206
See application file for complete search history.

(56) References Cited

U.S. PATENT DOCUMENTS

| | | | | |
|---|---|---|---|---|
| 6,725,228 | B1* | 4/2004 | Clark et al. | 1/1 |
| 7,117,504 | B2* | 10/2006 | Smith et al. | 719/328 |
| 7,209,953 | B2* | 4/2007 | Brooks | 709/206 |
| 7,444,374 | B1* | 10/2008 | Baker | 709/206 |
| 7,505,974 | B2* | 3/2009 | Gropper | 1/1 |
| 2002/0103873 | A1* | 8/2002 | Ramanathan et al. | 709/206 |
| 2003/0101343 | A1* | 5/2003 | Eaton et al. | 713/170 |
| 2003/0110371 | A1* | 6/2003 | Yang et al. | 713/100 |
| 2004/0128355 | A1* | 7/2004 | Chao et al. | 709/206 |
| 2004/0171369 | A1* | 9/2004 | Little et al. | 455/410 |
| 2004/0199529 | A1* | 10/2004 | Clark et al. | 707/100 |
| 2006/0020673 | A1* | 1/2006 | Sorge et al. | 709/206 |
| 2009/0327407 | A1* | 12/2009 | Gropper | 709/203 |

* cited by examiner

*Primary Examiner* — Dhairya A Patel
(74) *Attorney, Agent, or Firm* — Campbell Stephenson LLP

(57) ABSTRACT

A method, system, computer system, computer program product and application programming interface to support the use of multiple external messaging systems from within an application program and to track activities performed using any of the multiple external messaging systems. The application program allows a preferred messaging system to prepare, send, and receive messages from within the application program to be specified for each user of the application program. Multiple external messaging systems are available to be configured as the preferred or default messaging system for a given user. Activities performed using any of the external messaging systems can be tracked in a comprehensive collection of data about activity performed via the application program.

58 Claims, 5 Drawing Sheets

UNIVERSAL SUPPORT FOR MULTIPLE EXTERNAL MESSAGING SYSTEMS

Portions of this patent application contain materials that are subject to copyright protection. The copyright owner has no objection to the facsimile reproduction by anyone of the patent document, or the patent disclosure, as it appears in the Patent and Trademark Office file or records, but otherwise reserves all copyright rights whatsoever.

BACKGROUND OF THE INVENTION

1. Field of the Invention

This invention relates to messaging systems, and more particularly, to supporting the use of multiple external messaging systems in an application program.

2. Description of the Related Art

In a 24×7 international business environment, electronic messaging provides a convenient way for companies to communicate with customers all over the globe. Currently, many companies have dedicated e-mail inboxes defined for specific business areas. Often, employees called agents are assigned to poll and manage the support requests from customers for one or more dedicated e-mail inboxes, as well as from their individual agent inboxes. With customer support centers handling very large numbers of customer support requests daily, increasing the efficiency of each agent in responding to each customer request by only seconds can produce enormous cost savings for the customer support center.

To provide international support, companies must be able to communicate with customers using a variety of electronic messaging systems. If a company wishes to implement a customer support center where agents can communicate using multiple messaging systems, typically the company must purchase different software products to handle each messaging system because of the different communication protocols involved. Because different products must be purchased, agents must learn to use a different user interface for each messaging system. Efficiency of an agent typically degrades when he or she must remember different user interfaces for communicating with customers via different messaging systems.

Furthermore, tracking activities performed by a customer support center when agents are using many different application programs is cumbersome. It is desirable to capture data about all customer service activity, regardless of the application program used to perform the activity. Thus, it is desirable to enable customer service agents to communicate with customers using a variety of messaging systems and to track all activities performed, regardless of the application program used to perform the activity.

SUMMARY OF THE INVENTION

The present invention provides an application program capable of supporting multiple external messaging systems and tracking activities performed using any of the multiple external messaging systems. The application program allows a preferred messaging system to prepare, send, and receive messages from within the application program to be specified for each user of the application program. Multiple external messaging systems are available to be configured as the preferred or default messaging system for a given user. Activities performed using any of the external messaging systems can be tracked in a comprehensive collection of data about customer service activity.

In one embodiment, a method includes providing data related to a message to a selected message client upon launching the selected message client. The selected message client is one of multiple message clients configured to use the data to prepare the message, and at least two the message clients operate independently of the program providing the data.

In another embodiment, a method includes receiving data about a message from a selected message client when the message is sent. The selected message client is one of a plurality of message clients configured to provide the data, and at least two of the message clients operate independently of a program receiving the data.

In another embodiment, a method includes dynamically communicating data related to a message between a program and a selected message client. The selected message client is one of a plurality of message clients configured to use the data to prepare the message, and at least two the message clients operate independently of the program.

In yet another embodiment, an application programming interface includes a receiving function to receive data about a message from a selected message client when the message is sent. The selected message client is one of a plurality of message clients configured to provide the data; and at least two of the message clients operate independently of a program comprising the receiving function. The receiving function is configured to receive data related to a second message from a second message client of the message clients without changing the receiving function. The application programming interface can further include a providing function to provide second data related to the message upon launching the selected message client. The application programming interface may further include a deleting function to delete an activity record that was created upon launching the selected message client, wherein the deleting function is invoked when the message is not sent. The application programming interface may also include a get parameter function to obtain parameters for launching the selected message client.

In still another embodiment, an application programming interface includes a providing function to provide data related to a message to a selected message client upon launching the selected message client. The selected message client is one of a plurality of message clients configured to use the data to prepare the message, and at least two of the message clients operate independently of the providing module. The providing function is configured to provide second data related to a second message to a second message client of the message clients without changing the providing function. The application programming interface can further include a receiving function to receive second data about the message from the selected message client when the message is sent. The application programming interface can further include a deleting function to delete an activity record that was created upon launching the selected message client, wherein the deleting function is invoked when the message is not sent. The application programming interface can further include a get parameter function to obtain parameters for launching the selected message client.

Other embodiments of the invention include a system, computer system, and computer program product to provide the functionality of the methods described above.

BRIEF DESCRIPTION OF THE DRAWINGS

The present invention may be better understood, and its numerous objectives, features and advantages made apparent to those skilled in the art by referencing the accompanying drawings.

The use of the same reference symbols in different drawings indicates similar or identical items.

DETAILED DESCRIPTION

Figure 1:
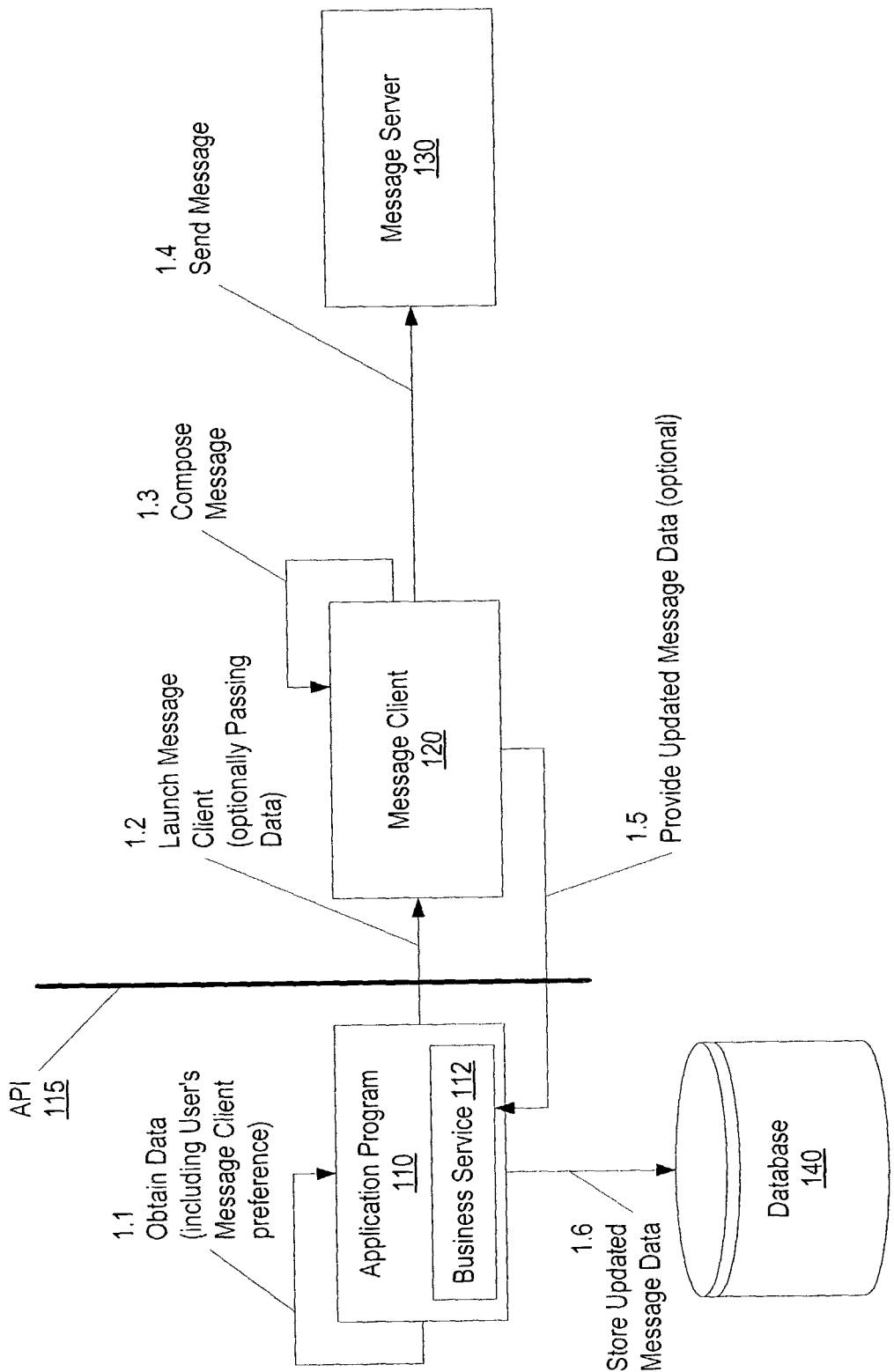
FIG. 1 shows interaction of an application program configured in accordance with the present invention with a message client and message server.

For a thorough understanding of the subject invention, refer to the following Detailed Description, including the appended Claims, in connection with the above-described Drawings.

References in the specification to "one embodiment" or "an embodiment" mean that a particular feature, structure, or characteristic described in connection with the embodiment is included in at least one embodiment of the invention. The appearances of the phrase "in one embodiment" in various places in the specification are not necessarily all referring to the same embodiment, nor are separate or alternative embodiments mutually exclusive of other embodiments. Moreover, various features are described that may be exhibited by some embodiments and not by others. Similarly, various requirements are described that may be requirements for some embodiments but not other embodiments.

Introduction

The present invention provides a method, system, computer system, computer program product, and application programming interface to support the use of multiple external messaging systems from within an application program. The application program allows a user to specify a preferred messaging system to prepare, send, and receive messages from within the application. The user can choose from multiple external messaging systems, and one of the external messaging systems can be configured as a default messaging system.

Examples of messaging systems that can be supported are Microsoft Outlook and Lotus Notes mail, although the invention is not limited to electronic mail messaging systems. As long as a messaging system client can be configured to receive data from and provide data to the application program, the messaging system can be used in conjunction with the present invention. For example, the scope of the invention can include other types of messages, such as short messaging service messages and instant Internet messages.

At least two of the message clients operate independently of the application program itself. In other words, the application program supports at least two external message clients that are not provided by or integrated with the application program. Even though the messaging systems are external to the application program, activities performed using the external messaging systems can be tracked in a comprehensive accumulation of data about activity performed.

In one embodiment, data related to a message are provided by the program to a selected message client upon launching the message client. As described above, the selected message client is one of the multiple external messaging system clients that are configured to use the data to prepare the message. For example, the application may provide data including a recipient address for the message. The recipient can be pre-populated in the message's recipient field by the message client.

In another embodiment, data about a message are provided to the application by the message client when the message is sent. The application can then store activity data about the message when the message is sent, even though the message was sent using an external message client.

In yet another embodiment, data related to a message are dynamically communicated between the application and the selected message client.

FIG. 1 shows an example embodiment of an application program 110 that supports multiple external messaging systems. Application program 110 may include client and server components, although a client/server architecture is not required for operation of the invention.

The external messaging systems may also include client and server components, such as message client 120 and message server 130, although the functionality of message client 120 and message server 130 may be combined as a single messaging module.

Application program 110 is shown as including a business service 112. Business service 112 enables communication of data between application program 110 and message client 120 via application programming interface 115.

In action 1.1, application program 110 obtains data, such as the user's message client preference. Other data may also be obtained, such as a recipient for the message that is obtained during user interaction with application program 110. In addition, data may be retrieved from database 140 to be included in the message; for example, a pre-formulated set of text may be retrieved to be included in the message. In a client/server architecture for application program 110, data may be passed between the client and server components to gather all data to be included in the message. In addition, application program 110 may create data records in database 140, such as an activity record, when an indication is received that the message is to be sent.

In action 1.2, the user's preferred message client 120 is launched, passing data related to the message collected in action 1.1, such as the recipient of the message. It is not required that data be passed with every message or upon each launch of the message client; rather, message client 120 is configured to use data when data are passed. In one embodiment, a script launches the message client, passing variable values for various types of data related to the message. Because message client 120 conforms to application programming interface 115 to receive message data, message client 120 can populate the message using the data received.

In action 1.3, the user of application program 110 uses message client 120 to compose the message. Message client 120 operates independently of application program 110 while the message is being composed. The user can add attachments, delete attachments, change the text of the message, and perform normal message editing tasks. In action 1.4, the user sends the message, which causes the message to be provided to message server 130.

In action 1.5, message client 120 provides updated message data to application program 110 via application programming interface 115. This data may include, for example, the body of the message, the recipient or other message header information, actual attachments to the message, and so on. It is not required that data be passed upon sending every message, although passing data back to the application program for processing provides valuable information about activities performed using the application program. Message client 120 is configured to send data when a message is sent.

In action 1.6, application program 110 stores the updated message data received from message client 120 in database 140. It is not required that the message data be stored, although for some application programs, such as customer support applications, storing the data provides valuable information that can be used to evaluate and track activities performed using the application program. One of skill in the art will also recognize that the storage mechanism need not be a database.

Each of the actions of FIG. 1 is described in further detail below.

Obtain Data

Figure 2A:
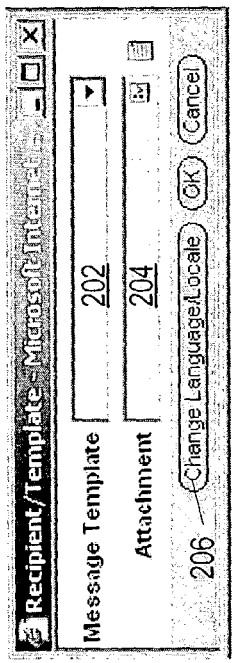
FIG. 2A shows an example of a window prompting a user for data related to a message being prepared by the user.
Figure 2B:
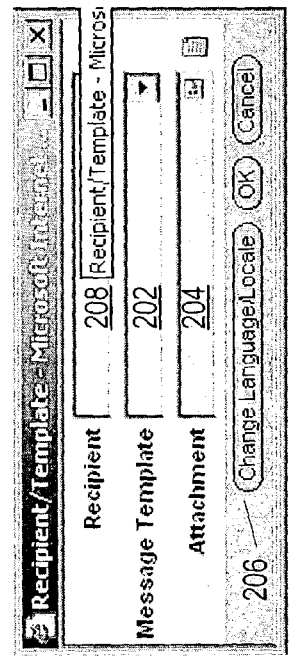
FIG. 2B shows another example of a window prompting a user for data related to a message being prepared by the user.

In one embodiment, application program 110 is configured to enable the user to compose a message using data to which the application program 110 has access. In this embodiment, a user can press a selected button to compose a message within application program 110, and the user is prompted to specify a recipient, template and/or attachment. Upon receiving an indication that the user wishes to send a message, application program 110 can prompt the user for a recipient; a template, which is a pre-defined set of text to include in the body of the message; and attachments to the message, if applicable. Example screens prompting the user are shown in FIGS. 2A and 2B. FIG. 2A shows a window prompting the user for a message template 202 and attachment data 204. The window also includes a change language/locale button 206. FIG. 2B shows another example of a window prompting a user for recipient 208, message template 202, and attachment data 204. The window also includes a change language/locale button 206. These data are gathered by application program 110 prior to launching message client 120.

As indicated above, attachments to a message can be selected within application program 110 and passed to message client 120. For example, assume that a customer service agent is working on a service request within application program 110 and is planning to send a message to the customer originating the service request. The agent can select to attach a document to the message using one of the windows shown in FIG. 2A or 2B. The attachments selected are preloaded to be passed to the message client 120 upon launching the message client. The attachments can be, for example, downloaded to the agent's local hard drive and populated in the message attachments.

After the specification of data for the message, the user confirms the selection and the data selected are stored. In one embodiment, a default message client for the user is determined by accessing a configuration database associated with application program 110, and the default message client is launched from within a script program. In one embodiment, a message client Object Linking & Embedding (OLE) automation object is used to launch the message client. In this embodiment, recipient, template, and/or attachment data are appended as script variables in the launching script. When the script is executed, values for the script variables are available for preparing the message. After message client 120 is launched, the user continues working within message client 120 to prepare and send the message.

Pass Data to Message Client

In one embodiment, the following information is passed from application program 110 to the message client 120:

Message information including To, CC, BCC, email body and subject

Information for creating records for activities performed using the message client Attachments that are selected from within the application program An Activity ID for an activity record for the current message The following table provides examples of parameters passed to the message client in one embodiment of the invention:

| Name | Purpose | Value | Comment |
| --- | --- | --- | --- |
| EnableActivityCreation | To inform the message client whether the creation of the activities was configured by the user. If TRUE, the message client should call the DeleteEmail( ) method to remove the activity at the end of the process as a result of aborting message or other abnormal termination | Text: TRUE or FALSE | |
| ActivityID | The row ID of the activity that is created for this message | Text | |
| ExtMailClientAttachmentDir | Shared directory where message clients will deposit the attachment files so that the application program could pick up the file and associate the file with the activity | Text | |
| Debug | TRUE to turn off debug. FALSE to turn off debug | Text: TRUE or FALSE | |
| ConnectString | The exact ConnectString information for the database | Text | The purpose of this string is to identify the database that the current client is talking to. |
| LanguageCode | Three letter language code | Text: ENU, FRA, etc. | |

Receive Data from Message Client

In one embodiment, an application program client component (not shown) of application program 110 runs on a computer system also hosting message client 120. In this embodiment, another process also runs on the host computer system to facilitate sending data from message client 120 to application program 110. For example, with a Microsoft Outlook message client, a form script runs within a web browser application program client on the computer system. The script captures a 'send message' event or the pressing of the send button. Upon detecting such an event or action, the script passes information related to the message back to application program 110, including addresses, the body of the message, and new attachments (those added via the message client, not including those passed to the message client from application program 110).

When a message includes newly-added attachments, the script uploads the new attachments to a specified network location. For example, in one embodiment, a temporary attachment directory is specified in a configuration file associated with application program 110. The directory is configured to provide write access only for users who can send attachments, which are copied into the directory. Application program 110 has read/write access to enable attachments to be retrieved and deleted when processing is complete.

In this embodiment, the script creates a web automation server Component Object Model (COM) object that is active when application program 110 is active. Upon detecting a 'send message' event or action within message client 120, the script invokes a CompleteMessage method of business service 112 to pass data to application program 110. In one embodiment, the CompleteMessage method can has two parameters: input argument and output argument. The input argument can includes addresses, the body of the message, and new attachments. The output argument is used to provide other types of data back to application program 110. The CompleteMessage method is described in further detail below.

Upon receiving the execution order through the invocation of business service 112, business service 112 updates activity records in database 140 with the new information from the message and data originally passed from application program 110. The business service also uses the attachments information to retrieve attachments from the specified network location. Attachments are then associated with an activity record for the message.

Application Programming Interface: Completing the Message

In the embodiments described above, an activity record is created when it is determined that the user wishes to send a message and message client 120 is launched. The user then actually completes and sends the message using message client 120. In one embodiment, a CompleteMessage method exists within the business service 112 of application program 110 to update the already-created activity record with new information passed from the message client 120. This data can include addresses ("TO," "CC," "BCC," etc.), body of the message, subject and attachments. The CompleteMessage method associates all new attachments, addresses, and other message data with the activity record.

Below are examples of parameters that can be used to pass data from the message client 120 (in this example, an e-mail client) to the application program 110:

| Name | Purpose | Value | Comments |
| --- | --- | --- | --- |
| Field: Email To Line | Email addresses on the "TO" | Text | Text as shown in the email client's TO field. |
| Field: Email CC Line | Email addresses on the "CC" | Text | Text as shown in the email client's CC field. |
| Field: Email BCC Line | Email addresses on the "BCC" | Text | Text as shown in the email client's BCC field. |
| Field: Description | Subject of the email | Text | Text as shown in the email client's SUBJECT field. |
| Field: Display Email Body | Email body | Text | Email Body (no limit) |
| Field: Email Sender Name | Sender's Name | Text | Sender's name, i.e., Max Weldon, or Max Weldon <wmax@nowhere.org>". The exact format depends on the email client. |
| AttachmentFile Names | It is list of the physical file name separated by semi-colon. Mail Client Script has to make sure that name is unique. | | File name should always be provided with full path. Application program code will pick up the file from the location and associate the file with the activity. For example, \\\attach\test1.txt;test2.txt; \\lotus\attach\test3.txt. If file name is not provided, the default path will be used. |
| AttachmentFile DisplayNames | It is the display name, which has sent to SMTP. It is in the same order as in the AttachmentFileNames. | | There is a one to one mapping between "AttachmentFileNames" and "AttachmentFileDisplayNames" |
| Field: Email Format | The format of the email | Text: "Plain Text" or "HTML/Plain Text" | |
| Id | The original activity ID | Text | |
| ContactList | All contact listed in this field will be associated with the activity | Text | It is a literal and it must be pass when EnableContactAssoc is set to TRUE. |

-continued

| Name | Purpose | Value | Comments |
|---|---|---|---|
| | | | ContactList is the set of lieteral separated by semi-colon. Each literal can be either full name or email address. First Name, Middle Name and Last Name are separated by a space. Following is an example: Example 1: Sanjeev Kumar, Zhanye Tong, wpak@siebel.com Example 2: sakumar@siebel.com, ztong@siebel.com, awu@siebel.com Example 3: Mary Jo Smith, Zhanye Tong Mary is the First name, Jo is the second name and Smith is the last name in Mary Jo Smith Zhanye is the first name and Tong is the last name in Zhanye Tong Note: First Contact in the ContactList will be the Primary Contact if no contact has been assigned to Activity. |
| EnableContactAssoc | When it is false, Contact is not associated with activity. In case of many contact with similar name in Contact database, Activity will be assigned to First Contact in Contact Database. | Text: TRUE or FALSE | |
| DeleteExistingAttachments | Deleting existing attachments before adding new attachments from the external mail client. | Text: TRUE or FALSE | When activity is created, application program-initiated attachments are already associated with the activities. When email client calls the CompleteEmail( ), email client could set "DeleteExistingAttachments" to TRUE and passes back to application program all attachments of the emails. However, the email client could intelligently determine which attachments were from Siebel and which are added and only pass the attachments that are added on the email client side. In that case, this flag should set to 'FALSE.' |
| ConnectString | This is the same string that was passed to the email client when the email client was launched | Text | If the ConnectString does not match with the ConnectString of the Server, the request will be denied and errorcode will be returned. |

In one embodiment, message addresses or names are used to attempt to find a match in a contacts or employee database, so that the activity can be associated with the contact or employee as well. Preferably, a unique identifier such as an address can be determined from the message; otherwise, finding a match based upon name, while allowed, is less precise due to the use of nicknames, aliases, and other factors. If no match is found, the message address and/or name can be returned as an output argument for possible addition to the contacts or employee database.

In one embodiment, the following data can be provided as output arguments by the CompleteMessage method:
　a. "Multiple Match Contacts," which returns a list of contacts matching the address and/or name.
　b. "No Match Contacts," which returns a list of contacts that have no matches in the contacts database.
　c. "FieldError," which indicates whether the operation is successful.
　d. "ExtErrorCode" which indicates the type of errors:
　　i. 0 Success
　　ii. 1 Required property "ConnectString" is missing or empty
　　iii. 2 "ConnectString" mismatch
　　iv. 3 Required property "Id" is missing
　　V. 4 Record with the specified id is not found
　　vi. 5 Failed to update the record
　　vii. 6 Other undocumented errors
　e. "ErrorCode" contains application program error code
　f. "ErrorMessage" contains application program error message in details.

The CompleteMessage method provides a way to update the activity record from a message client, so that any message client can update activity data.

Application Programming Interface: DeleteMessage Method

As previously described, in one embodiment, application program 110 creates an activity record for each outbound message before the launching of message client 120. At the end of the message processing, message client 120 can either call the CompleteMessage method to update the activity with new information from the message or a DeleteMesssage method to remove the activity record as a result of user cancellation.

In some situations, the DeleteMessage method may not be called because of problems with the message client 120 or the application program 110. In such a situation, an activity record may remain in database 140 without other associated data. In one embodiment, a workflow policy is established which periodically audits message activity records. Records can be deleted, for example, that have Type=Outbound Message, Status=In Progress, and a creation time exceeding a certain time limit.

The DeleteMessage method can be called when message processing is cancelled and the message will no longer be sent. In one embodiment for an e-mail client, the DeleteMessage method has the following parameters:

InputArgument:
1. Activity Id
2. ConnectString: The connect string
3. BusObj: This is the name of a business object having a value of "Message Agent Activity".
4. BusComp: This is a business component whose id is being passed having a value of "Comm Outbound Message".

OutputArgument: Same as "CompleteMessage" if applicable.

Application Programming Interface: GetEMailParameter

A GetEmailParameter method returns several parameters for invoking a message client. The parameter values are returned in the output argument of the method call and are represented as a NAME-VALUE pair. Examples of such parameters are given in the table below.

| Name | Value |
| --- | --- |
| Debug | Yes - turn on debug mode so that debug messages will be written to a local file If not present or No - turn off debug mode. No debug messages will be written |
| ExtMailClientAttDir | The default location where the attachments will be deposited by the message client and will be picked by the application program. The parameter consists of two parts: the client part and the server part separated by ";". The message client uses the client part of the attachment path to deposit the attachment file. When constructing a FileAttachmentList, the message client uses the second part to specify a full path file name. If full path is not specified, the default path (obtained from a configuration file on the server will be used) For example; \\clientsideserverhost\att; \\serverhost\att. Client will deposit file to \\clientsideserverhost\att but when constructing the attachment file list, \\serverhost\att should be used. |
| Connectstring | The connectstring that the application program is using. |

In one embodiment, when calling the GetEmailParameter method described above, the message client is expected to perform certain actions. For example, when the "Debug" flag is set to TRUE, the message client is expected to write all debug and error messages in a log file in a pre-specified name and location. Debug and error messages can include but are not limited to the following types of information:

a. Information that is received from the application program
b. Indicator whether the creation of a web automation object is successful
c. Indicator whether the invocation of method is successful
d. Output argument value that is returned from the method call
e. Input argument values passed through the method call
f. Some special consideration for Lotus notes script debug messages:
 i. Access to notes mailbox or replica database.
 ii. Access to form within mailbox or replica.
 iii. Access to application program COM automation server.
 iv. Some other problem writing the activity even though WebAutomation server is available.
 v. Saving the email in lotus.

Configuration of Default Message Client

In one embodiment, a configuration file is associated with a user of application program 110 and includes data such as a default message client, default directory for attachments, and names of scripts associated with different message clients available to the user.

Figure 3:
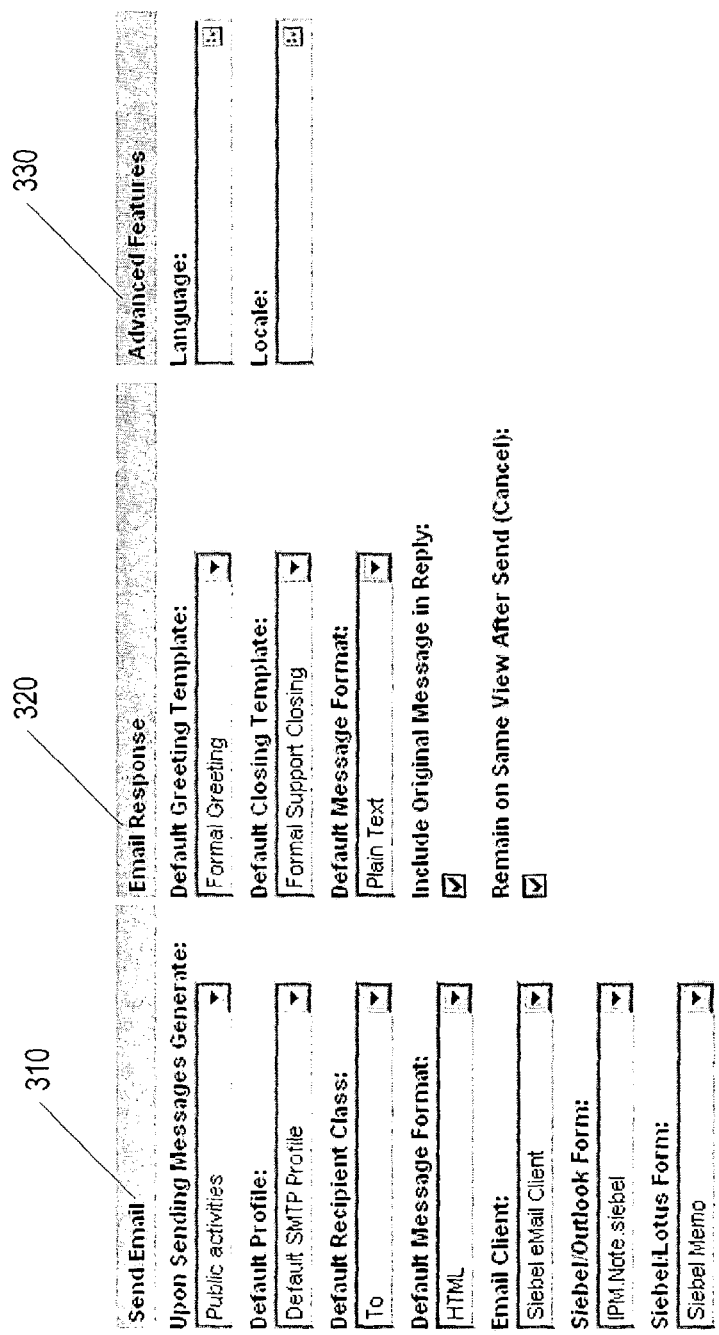
FIG. 3 shows an example of a user preferences interface to specify message preferences for a user of an application program configured to operate with multiple messaging systems.

FIG. 3 shows an example of a user preferences interface that enables message preferences for a user of application program 110 to be specified. In the example shown, the parameters 310 for sending e-mail, parameters 320 for sending a response to an e-mail, and parameters 330 for advanced messaging features can be specified. Parameters 310 for sending e-mail include a specification of the type of activity records to be generated upon sending a message; a default e-mail profile for the user; a default recipient class; a default message format (e.g., plain text or HTML); a default e-mail client (e.g., Microsoft Outlook or Lotus Notes); and forms associated with a Microsoft Outlook e-mail client and a Lotus e-mail client.

Parameters 320 for sending a response to an e-mail include a default greeting template (text), a default closing template, a default message format, an indicator whether the original message is to be included in the response, and an indicator of a view in the user interface to be displayed after a message is sent. Parameters 330 for advanced messaging features enable a user's default language and locale to be specified.

In one embodiment, users, such as customer service agents, log into application program 110 to perform customer service activities using a web browser client. Application program 110 is configured to use a web automation server object, which uses the same communication channel as is established during the initial user login process to communicate with application program 110. If the initial login uses a given protocol, subsequent communication through the web automation object is performed using the same protocol. Authentication is performed using a sessionid (using cookies) that was first obtained during the initial log on. If the communication is secure, this sessionid and cookies information is also protected.

In this embodiment, if multiple web clients are launched on a single machine, only one connection is made from the web automation server to the application program server. The connection corresponds to the last web client (user) to communicate with the application program server. Since updating of activity records is performed through the single channel, users on the same machine from different web clients should have similar access rights to activity data; otherwise, problems may occur with records to be updated by one user (login id) but created by another user (login id).

The above-described embodiments can be implemented using a variety of computer systems and architectures. The following section describes an example computing and network environment in which the present invention can be practiced.

An Example Computing and Network Environment

Figure 4:
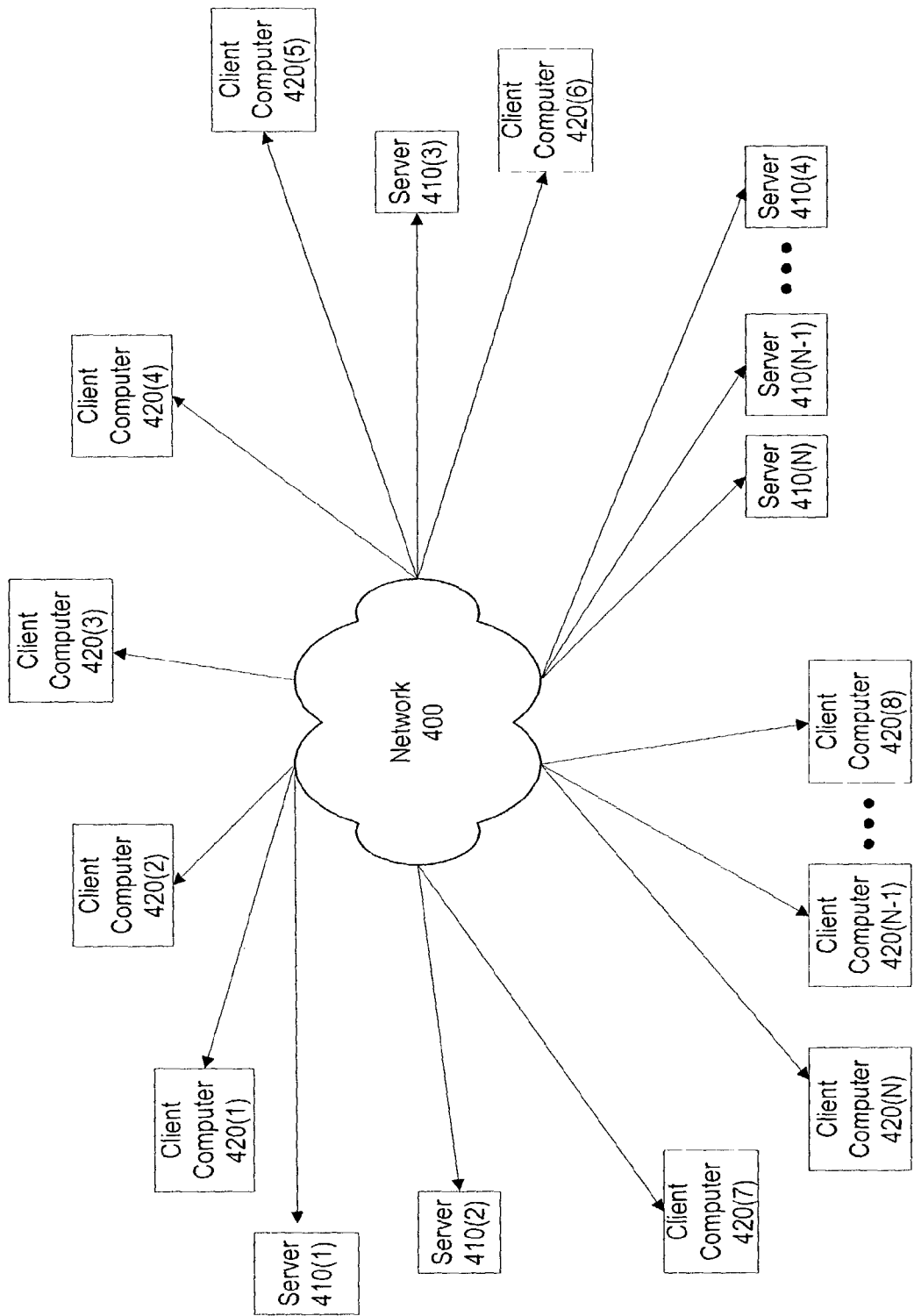
FIG. 4 shows an example of a networking environment in which the present invention can be practiced.

FIG. 4 is a block diagram illustrating a network environment in which a system according to the present invention may be practiced. As is illustrated in FIG. 4, network 400, such as a private wide area network (WAN) or the Internet, includes a number of networked servers 410(1)-(N) that are accessible by client computers 420(1)-(N). Communication between client computers 420(1)-(N) and servers 410(1)-(N) typically occurs over a publicly accessible network, such as a public switched telephone network (PSTN), a DSL connection, a cable modem connection or large bandwidth trunks (e.g., communications channels providing T1 or OC3 service) or wireless link. Client computers 420(1)-(N) access servers 410(1)-(N) through, for example, a service provider. This might be, for example, an Internet Service Provider (ISP) such as America On-Line™, Prodigy™, CompuServe™ or the like. Access is typically had by executing application specific software (e.g., network connection software and a browser) on the given one of client computers 420(1)-(N).

One or more of client computers 420(1)-(N) and/or one or more of servers 410(1)-(N) may be, for example, a computer system of any appropriate design, in general, including a mainframe, a mini-computer or a personal computer system. Such a computer system typically includes a system unit having a system processor and associated volatile and non-volatile memory, one or more display monitors and keyboards, one or more diskette drives, one or more fixed disk storage devices and one or more printers. These computer systems are typically information handling systems which are designed to provide computing power to one or more users, either locally or remotely. Such a computer system may also include one or a plurality of I/O devices (i.e., peripheral devices) which are coupled to the system processor and which perform specialized functions. Examples of I/O devices include modems, sound and video devices and specialized communication devices. Mass storage devices such as hard disks, CD-ROM drives and magneto-optical drives may also be provided, either as an integrated or peripheral device. One such example computer system, discussed in terms of client computers 420(1)-(N), is shown in detail in FIG. 4.

Figure 5:
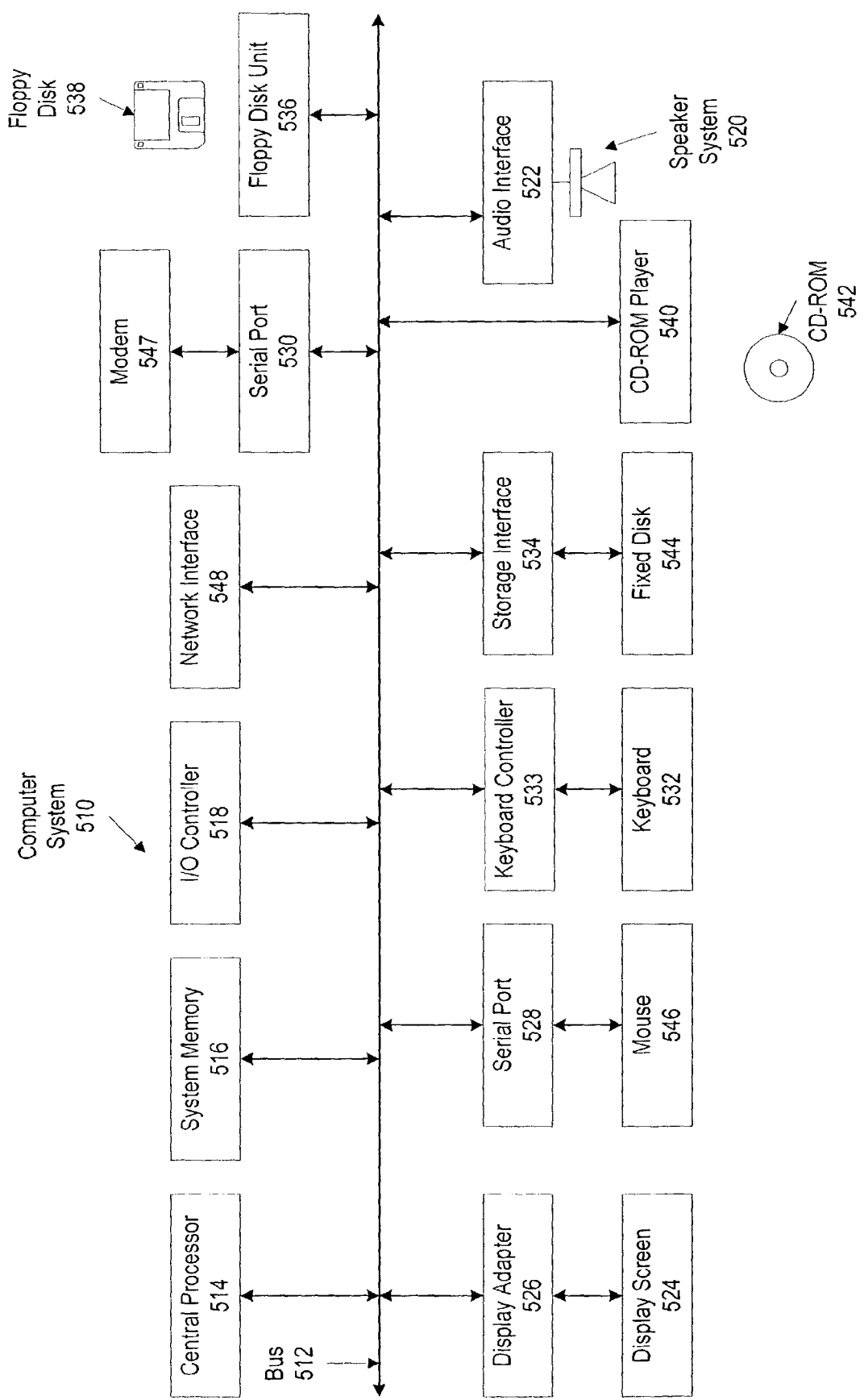
FIG. 5 shows an example of a computer system that can be used to operate the present invention.

FIG. 5 depicts a block diagram of a computer system 510 suitable for implementing the present invention, and example of one or more of client computers 420(1)-(N). Computer system 510 includes a bus 512 which interconnects major subsystems of computer system 510 such as a central processor 514, a system memory 516 (typically RAM, but which may also include ROM, flash RAM, or the like), an input/output controller 518, an external audio device such as a speaker system 520 via an audio output interface 522, an external device such as a display screen 524 via display adapter 526, serial ports 528 and 530, a keyboard 532 (interfaced with a keyboard controller 533), a storage interface 534, a floppy disk drive 536 operative to receive a floppy disk 538, and a CD-ROM drive 540 operative to receive a CD-ROM 542. Also included are a mouse 546 (or other point-and-click device, coupled to bus 512 via serial port 528), a modem 547 (coupled to bus 512 via serial port 530) and a network interface 548 (coupled directly to bus 512).

Bus 512 allows data communication between central processor 514 and system memory 516, which may include both read only memory (ROM) or flash memory (neither shown), and random access memory (RAM) (not shown), as previously noted. The RAM is generally the main memory into which the operating system and application programs are loaded and typically affords at least 66 megabytes of memory space. The ROM or flash memory may contain, among other code, the Basic Input-Output system (BIOS) which controls basic hardware operation such as the interaction with peripheral components. Applications resident with computer system 510 are generally stored on and accessed via a computer readable medium, such as a hard disk drive (e.g., fixed disk 544), an optical drive (e.g., CD-ROM drive 540), floppy disk unit 536 or other storage medium. Additionally, applications may be in the form of electronic signals modulated in accordance with the application and data communication technology when accessed via network modem 547 or interface 548.

Storage interface 534, as with the other storage interfaces of computer system 510, may connect to a standard computer readable medium for storage and/or retrieval of information, such as a fixed disk drive 544. Fixed disk drive 544 may be a part of computer system 510 or may be separate and accessed through other interface systems. Many other devices can be connected such as a mouse 546 connected to bus 512 via serial port 528, a modem 547 connected to bus 512 via serial port 530 and a network interface 548 connected directly to bus 512. Modem 547 may provide a direct connection to a remote server via a telephone link or to the Internet via an internet service provider (ISP). Network interface 548 may provide a direct connection to a remote server via a direct network link to the Internet via a POP (point of presence). Network interface 548 may provide such connection using wireless techniques, including digital cellular telephone connection, general packet radio service (GPRS) connection, digital satellite data connection or the like.

Many other devices or subsystems (not shown) may be connected in a similar manner (e.g., bar code readers, document scanners, digital cameras and so on). Conversely, it is not necessary for all of the devices shown in FIG. 5 to be present to practice the present invention. The devices and subsystems may be interconnected in different ways from that shown in FIG. 5. The operation of a computer system such as that shown in FIG. 5 is readily known in the art and is not discussed in detail in this application. Code to implement the present invention may be stored in computer-readable storage media such as one or more of system memory 516, fixed disk 544, CD-ROM 542, or floppy disk 538. Additionally, computer system 510 may be any kind of computing device, and so includes personal data assistants (PDAs), network appliance, X-window terminal or other such computing device. Computer system 510 also supports a number of Internet access tools, including, for example, an HTTP-compliant web browser having a JavaScript interpreter.

Other Embodiments

The foregoing describes an embodiment wherein some components are contained within other components. It is to be understood that such depicted architectures are merely examples; in fact, many other architectures can be implemented that achieve the same functionality. Any arrangement of components to achieve the same functionality is effectively "associated" such that the desired functionality is achieved.

The foregoing detailed description has set forth various embodiments of the present invention via the use of block diagrams, flowcharts, and examples. It will be understood by those within the art that each block diagram component, flowchart step, operation and/or component illustrated by the use of examples can be implemented, individually and/or collectively, by a wide range of hardware, software, firmware, or any combination thereof.

The present invention has been described in the context of fully functional computer systems; however, those skilled in the art will appreciate that the present invention is capable of being distributed as a program product in a variety of forms, and that the present invention applies equally regardless of the particular type of signal bearing media used to actually carry out the distribution. Examples of signal bearing media include recordable media such as floppy disks and CD-ROM, transmission type media such as digital and analog communications links, as well as media storage and distribution systems developed in the future.

The above-discussed embodiments may be implemented by software modules that perform certain tasks. The software modules discussed herein may include script, batch, or other executable files. The software modules may be stored on a machine-readable or computer-readable storage medium such as a disk drive. Storage devices used for storing software modules in accordance with an embodiment of the invention may be magnetic floppy disks, hard disks, or optical discs, such as CD-ROMs or CD-Rs, for example. A storage device used for storing firmware or hardware modules in accordance with an embodiment of the invention may also include a semiconductor-based memory, which may be permanently, removably or remotely coupled to a microprocessor/memory system. Thus, the modules may be stored within a computer system memory to configure the computer system to perform the functions of the module. Other new and various types of computer-readable storage media may be used to store the modules discussed herein.

The above description is intended to be illustrative of the invention and should not be taken to be limiting. Those skilled in the art will readily implement the steps necessary to provide the structures and the methods disclosed herein, and will understand that the process parameters and sequence of steps are given by way of example only and can be varied to achieve the desired structure as well as modifications that are within the scope of the invention. Variations and modifications of the embodiments disclosed herein can be made based on the description set forth herein, without departing from the scope of the invention.

Consequently, the invention is intended to be limited only by the scope of the appended claims, giving full cognizance to equivalents in all respects.

What is claimed is:

1. A method comprising:
providing first-message data from a program to a first message client, wherein the first-message data comprise data related to a first message;
receiving first-update data from the first message client by the program when the first message is sent from the first message client, wherein
the first-update data relate to an update made to the first message,
the receiving the first-update data from the first message client by the program is performed after the update has been made to the first message, and
the update made to the first message is made using a user interface of the first message client;
providing second-message data from the program to a second message client, wherein
the second-message data comprise data related to a second message,
the second message client is of a type that is different from the first message client,
the first message client is configured to operate independently of the program and independently of the second message client, and
the second message client is configured to operate independently of the program and independently of the first message client; and
receiving second-update data from the second message client by the program when the second message is sent from the second message client, wherein
the second-update data relate to an update made to the second message, and
the update made to the second message is made using a user interface of the second message client.

2. The method of claim 1 further comprising:
storing activity data for the message when the message is sent.

3. The method of claim 1 further comprising:
determining the first message client, from among a plurality of message clients of different types, using a preference of a user of the program.

4. The method of claim 1, wherein the first-message data related to the message comprises data to be included in the message.

5. The method of claim 1 wherein:
the providing first-message data from the program to the first message client comprises
communicating the first-message data through a first applications programming interface (API) that is distinct from the user interface of the first message client; and
the receiving the first-update data from the first message client by the program comprises
communicating the first-update through the first API when the first message is sent from the first message client.

6. A method comprising:
receiving first-message data related to a first message at a first message client;
transmitting first-update data from the first message client to a program when the first message is sent from the first message client, wherein
the first-update data relate to an update made to the first message,
the transmitting the first-update data from the first message client to the program is performed after the update has been made to the first message, and
the update made to the first message is made using a user interface of the first message client;
receiving second-message data related to a second message at a second message client, wherein
the second message client is of a type that is different from the first message client,
the first message client is configured to operate independently of the program and independently of the second message client, and
the second message client is configured to operate independently of the program and independently of the first message client; and
transmitting second-update data from the second message client to the program when the second message is sent from the second message client, wherein
the second-update data relate to an update made to the second message, and
the update made to the second message is made using a user interface of the second message client.

7. The method of claim 6 further comprising:
receiving first-update data about the message from the selected message client when the message is sent.

8. The method of claim 7 further comprising:
storing activity data for the message when the message is sent.

9. The method of claim 6 further comprising:
determining the first message client, from among a plurality of message clients, using a preference of a user of the program.

10. The method of claim 6, wherein the data related to the message comprises data to be included in the message.

11. A method comprising:
communicating first-message data related to a first message from a program to a first message client;
communicating first-update data to the program from the first message client when the message is sent, wherein
the first-update data relate to an update made to the first message,
the first-update data are communicated to the program from the first message client after the update has been made to the first message, and
the update made to the first message is made using a user interface of the first message client;
communicating second-message data from the program to a second message client, wherein
the second message client is of a type that is different from the first message client,
the first message client is configured to operate independently of the program and independently of the second message client, and
the second message client is configured to operate independently of the program and independently of the first message client; and
communicating second-update data from the second message client to the program when the second message is sent from the second message client, wherein
the second-update data relate to an update made to the second message, and
the update made to the second message is made using a user interface of the second message client.

12. The method of claim 11 wherein the dynamically communicating the first-message data comprises:
providing the first-message data from the program to the selected message client.

13. The method of claim 11 wherein the dynamically communicating the first-update data comprises:
providing the first-update data from the selected message client to the program when the message is sent.

14. A system comprising:
a processor;
first providing means for providing first-message data from a program to a first message client, wherein the first-message data comprise data related to a first message;
first receiving means for receiving first-update data from the first message client by the program when the first message is sent from the first message client, wherein
the first-update data relate to an update made to the first message,
the receiving the first-update data from the first message client by the program is performed after the update has been made to the first message, and
the update made to the first message is made using a user interface of the first message client;
second providing means for providing second-message data from the program to a second message client, wherein
the second-message data comprise data related to a second message,
the second message client is of a type that is different from the first message client,
the first message client is configured to operate independently of the program and independently of the second message client, and
the second message client is configured to operate independently of the program and independently of the first message client; and
second receiving means for receiving second-update data from the second message client by the program when the second message is sent from the second message client, wherein
the second-update data relate to an update made to the second message,
the update made to the second message is made using a user interface of the second message client, and
the first providing means, the first receiving means, the second providing means, and the second receiving means are executable on the processor.

15. The system of claim 14 further comprising:
storing means for storing activity data for the message when the message is sent, wherein the storing means are executable on the processor.

16. The system of claim 14 further comprising:
determining means for determining the first message client, from among a plurality of message clients, using a preference of a user of the program, wherein
the determining means are executable on the processor.

17. The system of claim 14, wherein the first-message data related to the message comprises data to be included in the message.

18. A system comprising:
a processor;
first receiving means for receiving first-message data related to a first message at a first message client;
first transmitting means for transmitting first-update data from the first message client to a program when the first message is sent from the first message client, wherein
the first-update data relate to an update made to the first message,
the transmitting the first-update data from the first message client to the program is performed after the update has been made to the first message, and
the update made to the first message is made using a user interface of the first message client;
second receiving means for receiving second-message data related to a second message at a second message client, wherein
the second message client is of a type that is different from the first message client,
the first message client is configured to operate independently of the program and independently of the second message client, and
the second message client is configured to operate independently of the program and independently of the first message client; and
second transmitting means for transmitting second-update data from the second message client to the program when the second message is sent from the second message client, wherein
the second-update data relate to an update made to the second message,
the update made to the second message is made using a user interface of the second message client, and the first receiving means, the first transmitting means, the second receiving means, and the second transmitting means are executable on the processor.

19. The system of claim 18 further comprising:
receiving means for receiving first-update data about the message from the selected message client when the message is sent, wherein
the receiving means are executable on the processor.

20. The system of claim 18 further comprising:
storing means for storing activity data for the message when the message is sent, wherein the storing means are executable on the processor.

21. The system of claim 18 further comprising:
determining means for determining the first message client, from among a plurality of message clients, using a preference of a user of the program, wherein
the determining means are executable on the processor.

22. The system of claim 18, wherein the data related to the message comprises data to be included in the message.

23. A system comprising:
a processor;
a first providing module to provide first-message data from a program to a first message client, wherein the first-message data comprise data related to a first message;
a first receiving module to receive first-update data from the first message client by the program when the first message is sent from the first message client, wherein
the first-update data relate to an update made to the first message,
the first-update data are received from the first message client by the program after the update has been made to the first message, and
the update made to the first message is made using a user interface of the first message client;
a second providing module to provide second-message data from the program to a second message client, wherein
the second-message data comprise data related to a second message,
the second message client is of a type that is different from the first message client,
the first message client is configured to operate independently of the program and independently of the second message client, and
the second message client is configured to operate independently of the program and independently of the first message client; and
a second receiving module to receive second-update data from the second message client by the program when the second message is sent from the second message client, wherein
the second-update data relate to an update made to the second message,
the update made to the second message is made using a user interface of the second message client, and
the first providing module, the first receiving module, the second providing module, and the second receiving module are executable on the processor.

24. The system of claim 23 further comprising:
a storing module to store activity data for the message when the message is sent, wherein
the storing module is executable on the processor.

25. The system of claim 23 further comprising:
a determining module to determine the first message client, from among a plurality of message clients, using a preference of a user of the program, wherein
the determining module is executable on the processor.

26. The system of claim 23, wherein the first-message data related to the message comprises data to be included in the message.

27. A system comprising:
a processor;
a first receiving module to receive first-message data related to a first message at a first message client;
a first transmitting module to transmit first-update data from the first message client to a program when the first message is sent from the first message client, wherein
the first-update data relate to an update made to the first message,
the first-update data are transmitted from the first message client to the program after the update has been made to the first message, and
the update made to the first message is made using a user interface of the first message client;
a second receiving module to receive second-message data related to a second message at a second message client, wherein
the second message client is of a type that is different from the first message client,
the first message client is configured to operate independently of the program and independently of the second message client, and
the second message client is configured to operate independently of the program and independently of the first message client; and
a second transmitting module to transmit second-update data from the second message client to the program when the second message is sent from the second message client, wherein
the second-update data relate to an update made to the second message,
the update made to the second message is made using a user interface of the second message client, and
the first receiving module, the first transmitting module, the second receiving module, and the second transmitting module are executable on the processor.

28. The system of claim 27 further comprising:
a receiving module to receive first-update data about the message from the selected message client when the message is sent, wherein
the receiving module is executable on the processor.

29. The system of claim 27 further comprising:
a storing module to store activity data for the message when the message is sent, wherein
the storing module is executable on the processor.

30. The system of claim 27 further comprising:
a determining module to determine the first message client, from among a plurality of message clients, using a preference of a user of the program, wherein
the determining module is executable on the processor.

31. The system of claim 27, wherein the data related to the message comprises data to be included in the message.

32. A computer system comprising:
a processor to process instructions; and
a memory to store the instructions, wherein the instructions comprise
first providing instructions to provide first-message data from a program to a first message client, wherein the first-message data comprise data related to a first message;
first receiving instructions to receive first-update data from the first message client by the program when the first message is sent from the first message client, wherein the first-update data relate to an update made to the first message, the first-update data are received from the first message client by the program after the update has been made to the first message, and the update made to the first message is made using a user interface of the first message client;

second providing instructions to provide second-message data from the program to a second message client, wherein the second-message data comprise data related to a second message, the second message client is of a type that is different from the first message client, the first message client is configured to operate independently of the program and independently of the second message client, and the second message client is configured to operate independently of the program and independently of the first message client; and second receiving instructions to receive second-update data from the second message client by the program when the second message is sent from the second message client, wherein the second-update data relate to an update made to the second message, and the update made to the second message is made using a user interface of the second message client.

33. The computer system of claim 32 wherein the instructions further comprise:

storing instructions to store activity data for the message when the message is sent.

34. The computer system of claim 32 further comprising:

determining instructions to determine the first message client, from among a plurality of message clients, using a preference of a user of the program.

35. The computer system of claim 32, wherein the first-message data related to the message comprises data to be included in the message.

36. A computer system comprising:

a processor to process instructions; and a memory to store the instructions, wherein the instructions comprise:

first receiving instructions to receive first-message data related to a first message at a first message client;

first transmitting instructions to transmit first-update data from the first message client to a program when the first message is sent from the first message client, wherein the first-update data relate to an update made to the first message, the first-update data are transmitted from the first message client to the program after the update has been made to the first message, and the update made to the first message is made using a user interface of the first message client;

second receiving instructions to receive second-message data related to a second message at a second message client, wherein the second message client is of a type that is different from the first message client, the first message client is configured to operate independently of the program and independently of the second message client, and the second message client is configured to operate independently of the program and independently of the first message client; and second transmitting instructions to transmit second-update data from the second message client to the program when the second message is sent from the second message client, wherein the second-update data relate to an update made to the second message, and the update made to the second message is made using a user interface of the second message client.

37. The computer system of claim 36 wherein the instructions further comprise:

receiving instructions to receive first-update data about the message from the selected message client when the message is sent.

38. The computer system of claim 36 wherein the instructions further comprise:

storing instructions to store activity data for the message when the message is sent.

39. The computer system of claim 36 wherein the instructions further comprise:

determining instructions to determine the first message client, from among a plurality of message clients, using a preference of a user of the program.

40. The computer system of claim 36, wherein the data related to the message comprises data to be included in the message.

41. A computer program product comprising:

a non-transitory computer-readable storage medium to store instructions, wherein the instructions comprise first providing instructions to provide first-message data from a program to a first message client, wherein the first-message data comprise data related to a first message;

first receiving instructions to receive first-update data from the first message client by the program when the first message is sent from the first message client, wherein the first-update data relate to an update made to the first message, the first-update data are received from the first message client by the program after the update has been made to the first message, and the update made to the first message is made using a user interface of the first message client;

second providing instructions to provide second-message data from the program to a second message client, wherein the second-message data comprise data related to a second message, the second message client is of a type that is different from the first message client, the first message client is configured to operate independently of the program and independently of the second message client, and the second message client is configured to operate independently of the program and independently of the first message client; and second receiving instructions to receive second-update data from the second message client by the program when the second message is sent from the second message client, wherein the second-update data relate to an update made to the second message, and the update made to the second message is made using a user interface of the second message client.

42. The computer program product of claim 41 wherein the instructions further comprise:

storing instructions to store activity data for the message when the message is sent.

43. The computer program product of claim 41 further comprising:
   determining instructions to determine the first message client, from among a plurality of message clients, using a preference of a user of the program.

44. The computer program product of claim 41, wherein the first-message data related to the message comprises data to be included in the message.

45. A computer program product comprising:
   a non-transitory computer-readable storage medium to store instructions, wherein the instructions comprise
      first receiving instructions to receive first-message data related to a first message at a first message client;
      first transmitting instructions to transmit first-update data from the first message client to a program when the first message is sent from the first message client, wherein
         the first-update data relate to an update made to the first message,
         the first-update data are transmitted from the first message client to the program after the update has been made to the first message, and
         the update made to the first message is made using a user interface of the first message client;
      second receiving instructions to receive second-message data related to a second message at a second message client, wherein
         the second message client is of a type that is different from the first message client,
         the first message client is configured to operate independently of the program and independently of the second message client, and
         the second message client is configured to operate independently of the program and independently of the first message client; and
      second transmitting instructions to transmit second-update data from the second message client to the program when the second message is sent from the second message client, wherein
         the second-update data relate to an update made to the second message, and
         the update made to the second message is made using a user interface of the second message client.

46. The computer product of claim 45 wherein the instructions further comprise:
   receiving instructions to receive first-update data about the message from the selected message client when the message is sent.

47. The computer product of claim 45 wherein the instructions further comprise:
   storing instructions to store activity data for the message when the message is sent.

48. The computer product of claim 45 wherein the instructions further comprise:
   determining instructions to determine the first message client, from among a plurality of message clients, using a preference of a user of the program.

49. The computer program product of claim 45, wherein the data related to the message comprises data to be included in the message.

50. An application programming interface comprising:
   a processor;
   a first providing function to provide first-message data from a program to a first message client, wherein the first-message data comprise data related to a first message;
   a first receiving function to receive first-update data from the first message client by the program when the first message is sent from the first message client, wherein
      the first-update data relate to an update made to the first message,
      the first-update data are received from the first message client by the program after the update has been made to the first message, and
      the update made to the first message is made using a user interface of the first message client;
   a get parameter function to obtain parameters for launching the first message client;
   a second providing function to provide second-message data from the program to a second message client, wherein
      the second-message data comprise data related to a second message,
      the second message client is of a type that is different from the first message client,
      the first message client is configured to operate independently of the program and independently of the second message client, and
      the second message client is configured to operate independently of the program and independently of the first message client; and
   a second receiving function to receive second-update data from the second message client by the program when the second message is sent from the second message client, wherein
      the second-update data relate to an update made to the second message,
      the update made to the second message is made using a user interface of the second message client, and
      the first providing function, the first receiving function, the second providing function, and the second receiving function are executable on the processor.

51. The application programming interface of claim 50 wherein
   the second receiving function is configured to receive data related to a second message from a second message client of the message clients without changing the receiving function, and
   the second receiving function is executable on the processor.

52. The application programming interface of claim 50 further comprising:
   a deleting function to delete an activity record that was created upon launching the selected message client, wherein
      the deleting function is invoked when the message is not sent, and
      the deleting function is executable on the processor.

53. The application programming interface of claim 50, wherein the first-message data related to the message comprises data to be included in the message.

54. An application programming interface comprising:
   a processor;
   a first receiving function to receive first-message data related to a first message at a first message client;

a first transmitting function to transmit first-update data from the first message client to a program when the first message is sent from the first message client, wherein
the first-update data relate to an update made to the first message,
the first-update data is transmitted from the first message client to the program after the update has been made to the first message, and
the update made to the first message is made using a user interface of the first message client;
a second receiving function to receive second-message data related to a second message at a second message client, wherein
the second message client is of a type that is different from the first message client,
the first message client is configured to operate independently of the program and independently of the second message client, and
the second message client is configured to operate independently of the program and independently of the first message client;
a second transmitting function to transmit second-update data from the second message client to the program when the second message is sent from the second message client, wherein
the second-update data relate to an update made to the second message, and
the update made to the second message is made using a user interface of the second message client; and
a get parameter function to obtain parameters for launching the first message client, wherein
the first receiving function, the first transmitting function, the second receiving function, the second transmitting function and the get parameter function are executable on the processor.

55. The application programming interface of claim 54 further comprising:
a receiving function to receive first-update data about the message from the selected message client when the message is sent, wherein
the receiving function is executable on the processor.

56. The application programming interface of claim 54 wherein
the second transmitting function is configured to send second-message data related to a second message to a second message client of the message clients without changing the second transmitting function, and
the second transmitting function is executable on the processor.

57. The application programming interface of claim 54 further comprising:
a deleting function to delete an activity record that was created upon launching the selected message client, wherein
the deleting function is invoked when the message is not sent, and
the deleting function is executable on the processor.

58. The of application programming interface of claim 54, wherein the data related to the message comprises data to be included in the message.

* * * * *

UNITED STATES PATENT AND TRADEMARK OFFICE
CERTIFICATE OF CORRECTION

PATENT NO. : 8,965,980 B2
APPLICATION NO. : 10/400833
DATED : February 24, 2015
INVENTOR(S) : Wai H. Pak et al.

It is certified that error appears in the above-identified patent and that said Letters Patent is hereby corrected as shown below:

In the Claims:

In column 17, line 3, in Claim 7, delete "selected" and insert --first-- after "the" and before "message".

In column 17, line 42, in Claim 12, delete "dynamically" after "the" and before "communicating".

In column 17, line 45, in Claim 12, delete "selected" and insert --first-- after "the" and before "message".

In column 17, line 46, in Claim 13, delete "dynamically" after "the" and before "communicating".

In column 17, line 48, in Claim 13, delete "selected" and insert --first-- after "the" and before "message".

In column 19, line 6, in Claim 19, delete "selected" and insert --first-- after "the" and before "message".

In column 20, line 42, in Claim 28, delete "selected" and insert --first-- after "the" and before "message".

In column 22, line 12, in Claim 37, delete "selected" and insert --first-- after "the" and before "message".

In column 23, line 49, in Claim 46, delete "selected" and insert --first-- after "the" and before "message".

In column 24, line 54, in Claim 52, delete "selected" and insert --first-- after "the" and before "message".
In column 26, line 8, in Claim 55, delete "selected" and insert --first-- after "the" and before Signed and Sealed this
Ninth Day of June, 2015

Michelle K. Lee
*Director of the United States Patent and Trademark Office*

"message".

In column 26, line 22, in Claim 57, delete "selected" and insert --first-- after "the" and before "message".